United States Patent
Stewart et al.

(10) Patent No.: US 6,169,731 B1
(45) Date of Patent: Jan. 2, 2001

(54) METHOD AND APPARATUS FOR SIGNAL ACQUISITION AND POWER CONTROL

(75) Inventors: Kenneth A. Stewart, Rolling Meadows; Sanjeev Garg, Skokie, both of IL (US)

(73) Assignee: Motorola, Inc., Schaumburg, IL (US)

(*) Notice: Under 35 U.S.C. 154(b), the term of this patent shall be extended for 0 days.

(21) Appl. No.: 09/037,676

(22) Filed: Mar. 10, 1998

(51) Int. Cl.[7] .................................................. H04Q 7/00
(52) U.S. Cl. ........................ 370/332; 370/333; 370/334
(58) Field of Search .................................. 370/332, 335, 370/252, 337, 465, 342, 441, 442, 320, 331, 333, 334; 375/130, 139, 225, 140; 455/277.2, 115, 442, 69, 516, 517, 524, 525

(56) References Cited

U.S. PATENT DOCUMENTS

| | | | |
|---|---|---|---|
| 5,257,283 | * 10/1993 | Gilhousen et al. | 375/1 |
| 5,396,516 | * 3/1995 | Padovani et al. | 370/342 |
| 5,862,453 | * 1/1999 | Love et al. | 455/69 |
| 6,032,033 | * 2/2000 | Morris et al. | 455/277.2 |

* cited by examiner

*Primary Examiner*—Dang Ton
*Assistant Examiner*—Anthony Ton
(74) *Attorney, Agent, or Firm*—Kenneth A. Haas

(57) ABSTRACT

A call setup process (200) has a fast and robust preamble signal acquisition and acknowledgement procedure (400). The procedure (400) is a multistage search technique for first identifying with high probability the preamble signal and for verifying signal acquisition. The procedure (400) further includes power control (408/426/428) and rate determination (430) capability for enhanced call setup processing.

16 Claims, 3 Drawing Sheets

400

METHOD AND APPARATUS FOR SIGNAL ACQUISITION AND POWER CONTROL

FIELD OF THE INVENTION

The present invention relates generally to wireless communication systems, and more particularly, to a method for controlling the transmit power of a communication device operating in a wireless communication system.

BACKGROUND OF THE INVENTION

Wireless communication systems, such as analog and digital cellular communication systems, personal communication systems (PCS) and other similar wireless communication systems, provide a great deal of freedom to their users. A wireless communication system user is always in touch. And, in spite of the complexity underlying the wireless communication system, to the user using the system is as easy as dialing a phone number.

Sometimes, a user will be unable to place or receive a call, or an ongoing call will be unexpectedly disconnected. One has to remember that at least a portion of the wireless communication system is a radio frequency (RF) link between the remote user and the system. There are a number of factors which influence how and why a call may not be completed or is disconnected. For example, system capacity, i.e., the number of available radio frequency links, may be exhausted. The user might be out of range, or interference may render the radio link unsuitable for maintaining the call. In any event, the user is inconvenienced.

Of course, in wireless communication systems, such as cellular and PCS communication systems, high call completion and high system capacity are requirements. In a type of cellular and/or PCS communication system known as code division multiple access (CDMA) digital cellular system, call setup and system capacity are related to the call processing algorithm implemented during the call setup process, and to the transmitting power of mobile stations (MS) operating in the system.

In a CDMA communication system implemented in accordance with the IS-95-A standard, land- and mobile-originated calls are prone to failure during the signaling protocol required to establish or complete a call. That is, the communications between the MS and the base station (BS) to place the MS on a Traffic Channel (TCH, i.e., a communication link used for transmitting and receiving data, typically coded speech, between the system and the mobile station). In certain systems, call failure rates may be as unacceptably high as 2–4% of all call attempts. These failures are attributable to several weaknesses in conventional implementations of the BS signal processing executed during call set-up, and particularly, that portion associated with the BS acquiring the MS preamble transmission leading to these call failures.

The conventional preamble acquisition search algorithm is a single-dwell serial search technique applied to one or both receiving antennas at the BS. If a search statistic associated with any multiple signal component exceeds a threshold, acquisition is declared with the multiple signal component generating that statistic being used for subsequent demodulation of the received signals. In order to discriminate between genuine signal multipath components and noise, and to meet a tolerable specification for false preamble acquisition (e.g., 1 in 1000 call attempts at 7 decibels (dB) information bit energy/noise density (Eb/No) signal level with 3 seconds delay prior to preamble transmission) the search integration period "dwell time" must be large. This increases the time required to search cells within the communication system with large radii when the MS location information is not available to the receiver, or is unreliable.

Following declaration of acquisition, rake fingers are assigned to the delays at which the preamble acquisition search algorithm indicated valid multiple signal components to be present, and demodulation begins. After a correct or false preamble acquisition, however, the BS will signal to the MS that acquisition has occurred.

Upon receipt of the BS Ack. Order indicating valid preamble acquisition, the MS ceases preamble transmission. In the case of false acquisitions, this deprives the BS receiver of the optimal signal to use to attempt proper acquisition. The BS receiver then has to attempt to re-acquire the MS using the modulated null traffic frame sequence that—according to the IS-95-A specification—follows the preamble phase. However, this frame sequence is an ⅛-rate transmission, and the efficiency of the re-acquisition attempt is highly reduced since signal is not present on the channel ⅞'s of the time.

If the BS receiver has falsely acquired the preamble signal the first MS Ack. Order transmitted by the MS in response to the BS Ack. Order declaring acquisition may be lost. This is because the BS receiver may be unable to successfully demodulate the MS Ack. Order, which depends on whether the BS modulated data search has successfully reacquired the MS before transmission of this message. Retransmission of the MS Ack. Order unnecessarily extends the call set-up time.

Another undesirable side effect of false preamble acquisition is the possibility of instability in the MS transmit power control loop. In one possible implementation, the idle pattern initially transmitted to the MS via the traffic channel power control sub-channel is replaced with power control decisions based on the demodulated power control metric upon detection that at least one of the four available rake fingers is in the "lock" state. The initial finger assignments that drive this decision may be made prior to the demodulation phase at the same time that preamble acquisition is declared.

The filters controlling the lock status of these assignments are updated, on average, every 10 ms at the rate of the ⅛-rate power control groups (PCGs). Depending on how the lock filter state variables are initialized, and the delay between the finger assignments and the first ⅛-rate PCG, it is possible for fingers that have been falsely assigned during the preamble acquisition search algorithm to delays at which no signal components exist to remain in lock for several 10's of milliseconds before lock filtering changes their status to the "unlocked" state. At this point, the idle pattern is restored.

Since the receiver power control metric computed every PCG from such false assignments will almost always result in the +1 dB "power-up" decision, and since the MS continues to transmit preamble and hence act on every received power control bit until the BS Ack. Order acknowledging preamble acquisition is received, the MS may receive several consecutive +1 dB power control decisions until a) all the falsely assigned fingers autonomously exit lock under lock filter control thus restoring the power control idle pattern, or b) a subsequent modulated data or "multipath" search detects the true signal delay and assigns an available finger, thus correcting the power control metric estimate.

Since these processes may last for 10's of milliseconds, erroneous power control decisions may well continue sufficiently long for large "spikes" in MS transmitted power of several 10's of dB to be observed at the MS transmitter. Field and laboratory testing has verified evidence of these problematic transients or "spikes" (which may be as high as 30 decibels (dB)) in mobile station transmit power during call origination. As is known, in a CDMA communication system, system capacity, as related to cell size, is closely effected by MS transmit power. So not only do these spikes effect the MS attempting to originate or terminate a call, they may also effect other MSs operating in the system.

Yet another potential weakness in the existing implementations is the use—immediately after the acquisition procedure terminates - of the rate-determination scheme intended to discriminate between transmission rates used during variable-rate transmissions (Service Option 1 in an IS-95-A implemented CDMA communication system). This can lead to erroneous frame classifications and poor power control loop performance.

The response of the rate determination algorithm to frames comprising the preamble sequence depends on the SNR of the received frames and the algorithm implementation. If acquisition has been properly achieved, and if the preamble signal SNR is high, the rate determination algorithm for rate set 1 may, for example, identify preamble frames as rate-¼. Depending on the implementation of the algorithm low SNR, classification of preamble frames as rate-¼, rate-⅛ or erasure is possible. The result is that preamble frames received at high SNR may be reported not as erasures but as valid rate-¼ frames. The BS may therefore not acknowledge a successful preamble acquisition, especially if the acquisition is made at high SNR. Since this acknowledgment must be delivered within 2 seconds of the start of preamble transmission by the MS, there exists a possibility that the call setup will fail, unless the preamble signal SNR at the receiver drops sufficiently to cause the required erasure to be generated.

In summary therefore, in present CDMA communication systems, the preamble acquisition search algorithm may be slow and—although it is nominally designed to meet the required false acquisition probability—may be insufficiently robust to account for equipment tolerances (e.g. AGC setpoint error) and implementation error. It is therefore prone to false preamble acquisition. The penalties for false acquisition can be severe, including transmitter power transients at the MS, erroneous acknowledgement of acquisition and hence premature termination of the desirable preamble sequence before successful acquisition, layer-2 errors and signaling delays, and ultimately failed or dropped calls. Also, even if preamble acquisition is successful, the rate determination algorithm can cause the BS to fail to acknowledge preamble acquisition, even at high SNR.

Thus there is a need for a call setup process including a robust preamble acquisition procedure. Preferably, the preamble acquisition procedure would provide for early preamble acquisition and acknowledgement with reduced probability of false acknowledgment and premature termination. Additionally, the procedure would guard against MS transient power spikes and provide for MS power control during call setup. The procedure would also reduce the possibility of acknowledgement errors due to BS processing functions.

DETAILED DESCRIPTION OF THE PREFERRED EMBODIMENTS

The present invention provides a call setup process for a wireless communication system having a fast preamble signal acquisition and acknowledgment procedure. In accordance with a preferred embodiment of the present invention, the call setup process of the present invention includes a preamble acquisition procedure based upon a multi-stage search technique and includes power control procedures and rate determination functionality as will be described. The invention is described in terms of a preferred implementation as part of a CDMA communication system, however, one of ordinary skill in the art will appreciate that its teachings extend beyond the preferred embodiment described herein.

Figure 1:
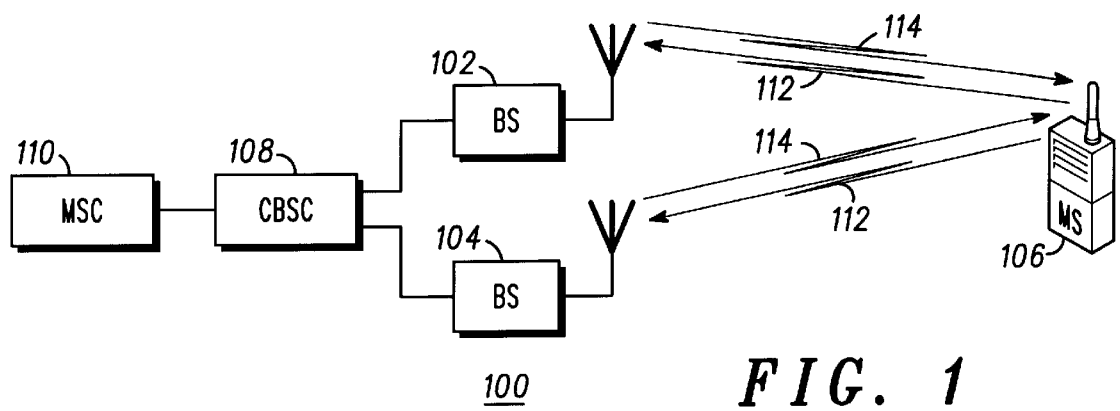
FIG. 1 is a of a wireless communication system in accordance with a preferred embodiment of the present invention.

FIG. 1 illustrates a communication system 100 that preferably operates in accordance with a Code Division Multiple Access (CDMA) system protocol (e.g., IS-95-A). Communication system 100 includes a base station (BS) 102, a BS 104, a mobile station (MS) 106, a centralized base station controller (CBSC) 108, and a mobile switching center (MSC) 110. In the preferred embodiment of the present invention BS 102 and BS 104 are preferably Motorola SC9600 base stations, MSC 110 is preferably a Motorola EMX2500 MSC, and CBSC 108 is preferably a Motorola SG1128BF CBSC component. In the preferred embodiment of the present invention, BS 102 and BS 104 are suitably coupled to CBSC 108, and CBSC 108 is suitably coupled to MSC 110. Mobile station 106 is preferably a mobile radiotelephone such as a cellular radiotelephone or a personal communication system (PCS) handset, which communicates via uplink signals 112 and downlink signals 114 with BS 102 and BS 104.

Figure 2:
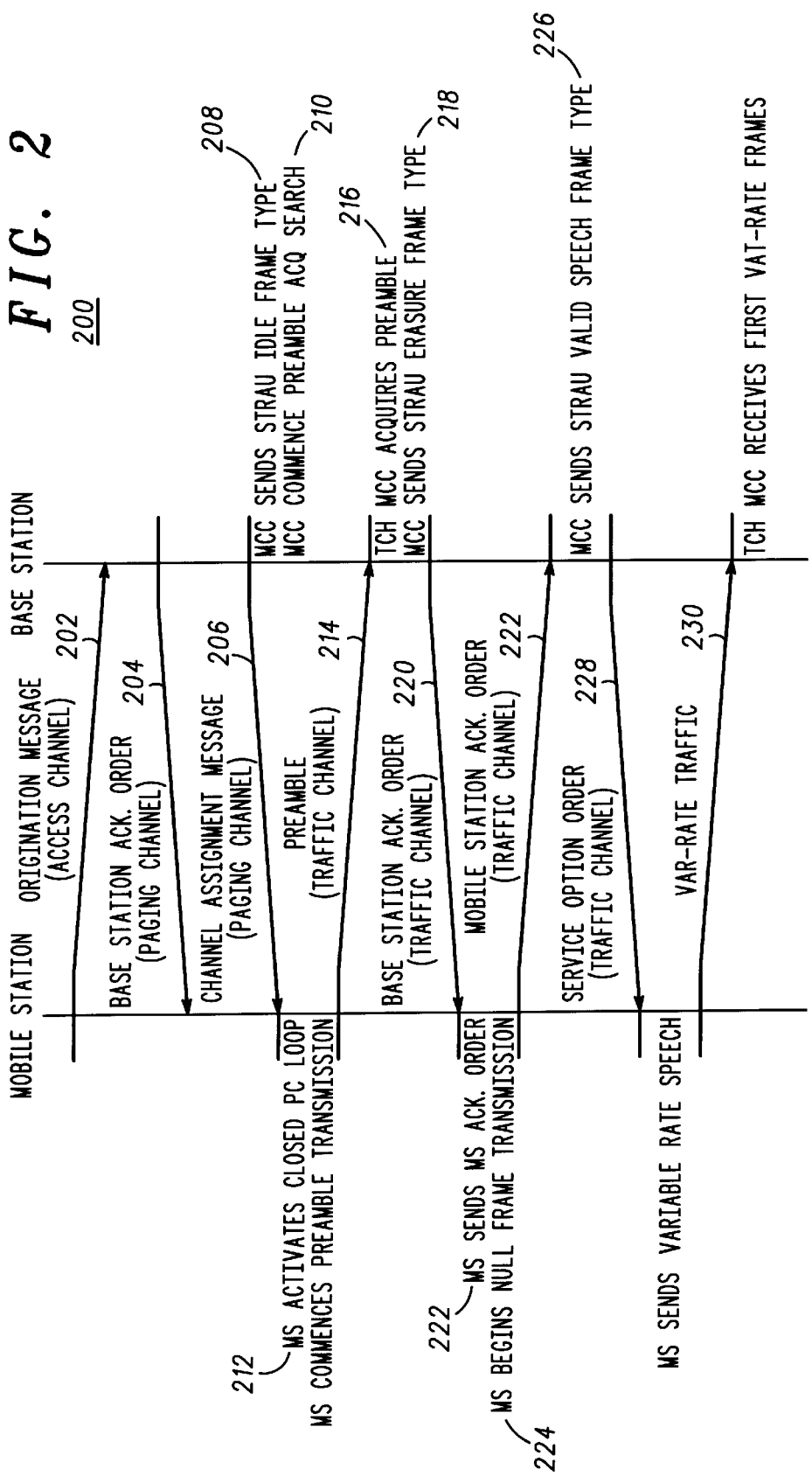
FIG. 2 is a signal flow diagram illustrating origination call processing.

To assist in the understanding of the present invention it is useful to first understand the call origination process in an IS-95-A CDMA communication system. FIG. 2 illustrates such a call setup process 200. Initially MS 106 is in the MS idle state. After the user places a call (according to the mobile station call origination operation defined in IS-95-A) the MS enters a mobile station origination substate of the system access state. MS 106 transmits an Origination Message 20—as an Access channel (ACC) burst or probe—to the BS transceiver (part of BS 102 and BS 104) dedicated to the Paging and Access channels (PCH-ACC), implemented on the PCH-ACC MCC (Multiple channel card) card (not shown) portion of BS 102/104. After successful reception of Origination Message 202, BS 102/104 transmits, via the Paging channel card, an acknowledgement 204 (Base Station Ack. Order) to MS 106 via the Paging channel. MS 106 receives acknowledgement 204 and waits for a Channel Assignment Message 206 from BS 102/104. BS 102/104, following higher-layer network activity 208 at the XCDR and mobility manager (MM) portions of CBSC 108, assigns a traffic channel transmitter-receiver (TCH MCC) card (not shown) to handle the call and sends a Channel Assignment Message 206.

BS 102/104 also be gins several activities associated with preamble acquisition 210. First, BS 102/104 begins transmission of null frames on the assigned traffic channel. Also, BS 102/104 begins transmission of 1.25 ms-spaced power control bits on the traffic channel power control sub-channel, where there are 16 power control bits transmitted per 20 ms frame, or 1 bit per 1.25 ms Power Control Group (PCG). Since BS 102/104 has not received signals from MS 106, the transmit ted bit sequence is usually the so called "idle" pattern consisting of alternate +1,−1 bits. In accordance with the IS-95-A specification, each bit orders MS 106 to increase or decrease, respectively, its transmitted power level by 1 dB in delta-modulation fashion. BS 102/104 also initializes a STRAU (i.e. encoded speech) link to the XCDR to the STRAU idle pattern and commences a search for the preamble transmission. MS activates closed power loop control 212 and begins preamble transmission 214 following receipt of the Channel Assignment Message 206. The search procedure resolves the delay of exploitable multipath components at which the spread-spectrum transmission from MS 106 is received.

The IS-95-A specification sets forth that the preamble signal is the all-zero Walsh symbol sequence. BS 102/104 uses this signal to improve the signal-to-noise ratio (SNR) of the preamble acquisition search procedure. Although reliable information on the delay at which Origination Message 202 was successfully demodulated can be used to limit the extent of the uncertainty region of the preamble acquisition search (i.e., reduce the size of the search window), the preamble acquisition search can not be entirely eliminated since the BS-MS RF channel or MS location may have changed since Origination Message 202 was delivered.

If Channel Assignment message 206 is successfully received by MS 106, it enters the Mobile Station Control on the Traffic Channel State. MS 106 then sets the assigned forward traffic channel Walsh cover, sets the reverse traffic channel long code mask, and attempts to demodulate the extant forward traffic channel null traffic channel frame sequence.

If MS 106 successfully demodulates two (2) consecutive good null traffic frames within 200 ms of beginning demodulation, it initiates the preamble transmission 214 using the specified long code mask and commences taking action on the bit pattern transmitted on the traffic channel power control subchannel. Note that the IS-95-A specification requires that MS 106 act on any power control bit corresponding to a valid PCG. Since all transmitted PCGs are valid during preamble transmission, the slew rate of MS 106 transmitted power level in this state is up to 16 dB per 20 ms frame. If MS 106 cannot demodulate the forward TCH, the call fails.

It is important to note that if the Channel Assignment message 204 fails to be delivered successfully by the Paging channel (due, for example, to excess interference at MS 106) that message may be retransmitted up to 3 more times by the PCH-ACH MCC before the call is declared to have failed. This means that, depending on the message erasure rate of the PCH, BS 102/104 may attempt to acquire preamble for several seconds before MS 106 begins preamble transmission. This exposes BS 102/104 to increased risk of false detection.

Following commencement of preamble transmission by MS 106, BS 102/104 acquires 216 the MS 106 transmission and informs 218 the PCH-ACH-MCC that acquisition has been successfully achieved. In order to inform MS 106 that the preamble signal has been acquired, BS 102/104 sends a BS Ack. Order 220 to MS 106 via the forward traffic channel. The MS 106 state is then changed to the Conversation State. Once in the Conversation State, MS 106 sends a MS Ack. Order 222 to BS 102/104 as a 1-frame Traffic channel signaling message 222. This appears as a full-rate frame to the BS 102/104 receiver with information bit tags to indicate a signaling message. MS 106 also terminates preamble transmission and begins transmission of the null Traffic sequence 224.

The BS Ack. Order used to indicate successful preamble acquisition to MS 106 is generated by the XCDR. Transmission of this message by the XCDR is triggered by the observation at the XCDR of five or more consecutive STRAU IDLE frames followed by one STRAU SPEECH frame with "erasure" frame quality. This is based on the assumption that preamble frames successfully demodulated following acquisition will be declared by the rate-determination algorithm to be erasures, in place of the previous STRAU IDLE frames sent prior to acquisition by BS 102/104.

The change in transmission by MS 106 from preamble to idle traffic transmission is similarly detected by the XCDR as three or more consecutive STRAU SPEECH frames with "non-erasure" frame quality 226 (additionally a network entity may also verify reception of the MS Ack. Order 222). This change in STRAU frame type is required by the XCDR to send the Service Option Response Order 228 specifying the service option to be used (usually Service Option 1, the default speech service option). After acknowledgement by MS 106, MS 106 begins variable-speech transmission 230 on the Traffic Channel.

Figure 3:
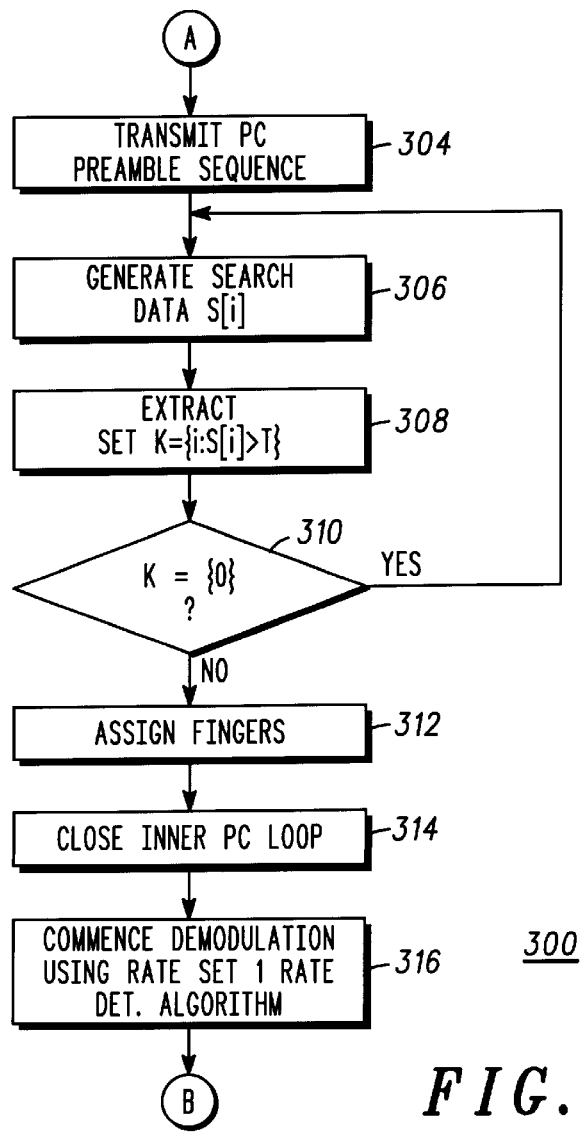
FIG. 3 is a flow diagram illustrating a prior art preamble acquisition procedure.

As noted above, beginning with the Origination Message 202 from MS 106 to BS 102/104 over the Access channel (ACC) and following the BS acknowledgement, (BS Ack. Order) 204 and a channel assignment message 206, BS 102/104 begins the preamble acquisition procedure 208. Referring to FIG. 3, an example of an acquisition procedure, BS preamble acquisition procedure 300, is illustrated. At step 304 BS 102/104 begins transmission of the as described "idle" power control sequence. At step 306, the BS search engine generates statistics for the multipath signal delays. Delays for which the statistic exceeds a threshold T are identified, step 308. If delays are identified, step 310, rake fingers are accordingly assigned to the identified delays, step 312. That is, preamble acquisition is declared. Otherwise the search continues. With assignment of the rake fingers, the "inner" power control loop is closed, step 314, and demodulation begins using rate set 1, step 316. As described, however, the foregoing procedure 300 suffers numerous disadvantages.

Figure 4:
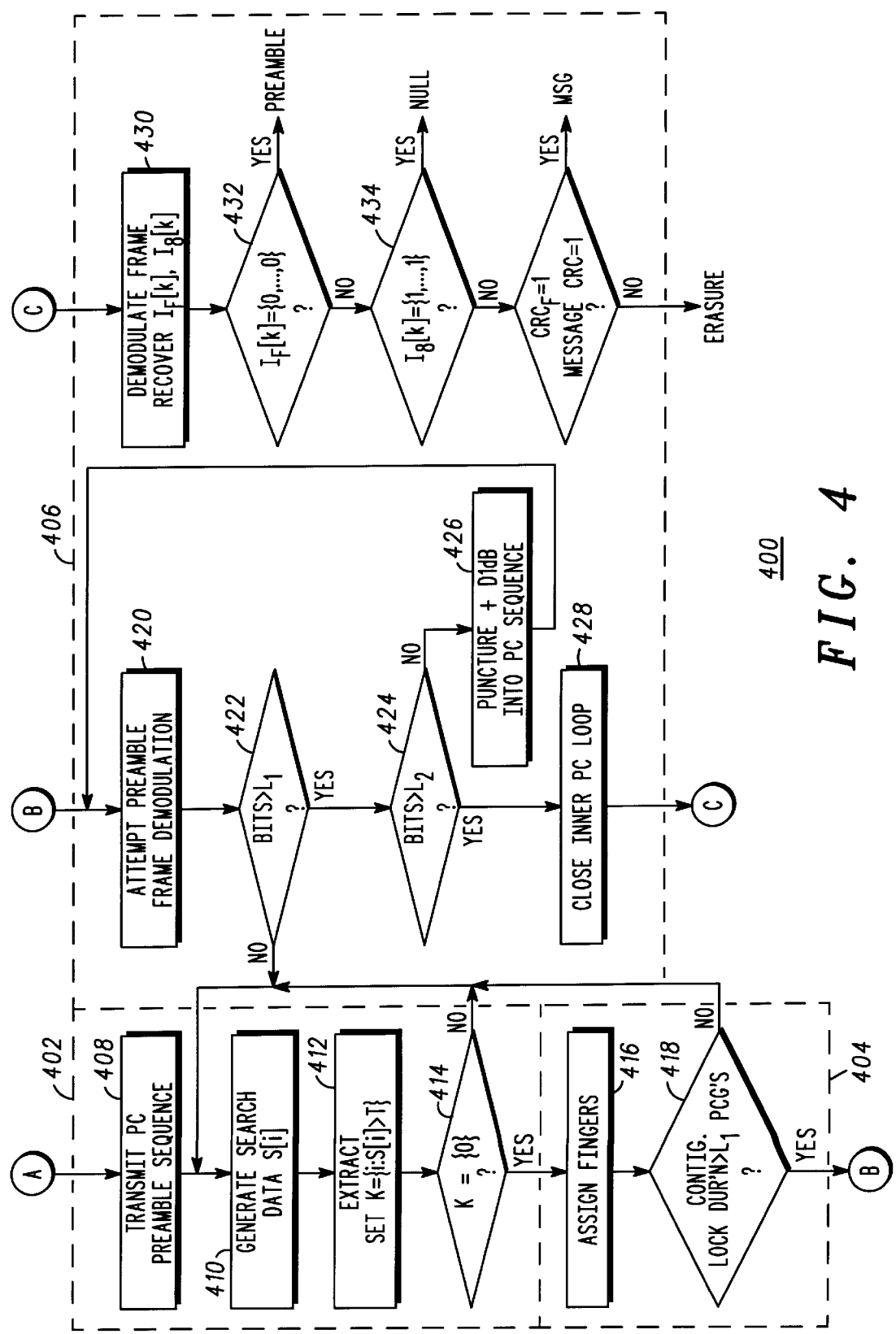
FIG. 4 is a flow diagram illustrating a preamble acquisition procedure in accordance with a preferred embodiment of the present invention.

Now, in accordance with a preferred embodiment of the present invention, a robust preamble acquisition procedure 400 is illustrated in FIG. 4. In a preferred embodiment of the present invention, the preamble acquisition procedure is a multi-stage search technique. First, a signal search engine, implemented as part of the call processing components of BS 102/104 (e.g., using the CSM IS-95-A demodulator application specific integrated circuit (ASIC) available from Qualcomm, Inc. of San Diego, Calif.) is used to identify candidate delays at which multipath components of the preamble signal are indicated to be present. Generation of these search results is termed phase 1, 402, of the preamble search procedure. The search engine continues to generate this search data for use by the subsequent phases of the procedure until acquisition is declared. In phase 2, 404, as the search engine seeks additional multipath components to those already identified, the search engine demodulator rake fingers are configured as a secondary search engine in order to verify the multipath components or "candidates" located during phase 1 search. Phase 3, 406, completes the verification process by checking the known information content of the preamble frames to declare preamble acquisition with high reliability.

In more detail, and with continued reference to FIG. 4, at the start of phase 1, BS 102/104 begins transmission of the preamble power control "idle" sequence on the traffic channel power control subchannel, step 408. The preamble acquisition search procedure generates search statistics for both antennas at each of a uniformly spaced array of delays (each such delay is commonly termed a search "bin"), step 410. In a preferred embodiment a process of continuously searching on both antennas the entire region of possible delays—termed the uncertainty region—within which MS 106 should be located is undertaken. A single such search is defined as a single examination of both antennas observing the sector at __-chip resolution. The size of this region is dependent on whether the search is "directed" or "non-directed." A directed search utilizes a reliable preamble location indicator from the ACC indicating the delay at which the strongest mean multipath component for the origination message was demodulated. A "non-directed" search does not have the a-priori knowledge of MS 106 delay available, and the entire access window is searched.

During the directed search, a first timer, T1, preferably about 300 milliseconds (ms), is started. If the directed search has not acquired within T1, the search mode is switched to non-directed. This allows for recovery from an erroneous preamble location indication.

After switching to the non-directed search mode, upon expiration of timer T1, the idle power control pattern is replaced by a previously generated pattern instructing a net "D" dB, preferably about 5 dB, change in MS 106 transmit power level uniformly distributed over a time period T2, preferably about 500 ms. To prevent dangerous open loop transit power gain adjustments at MS 106, at least one search of the of the uncertainty region is executed before every discrete increase in MS 106 transmit power. Also, by providing a non-directed search following a directed search, the possibility that the search window does not contain the actual MS 106 delays is reduced. After complete transmission of the total power increase pattern, the idle pattern is restored.

The search statistic is generated at each bin by integrating—over a specified number of Walsh symbols—the energy of the zeroth fast Hadamard transformation (FHT) output despread at the PN offset associated with that bin. The integration period is reduced to preferably 2 Walsh symbols from the typically specified value of 6 Walsh symbols, but may be other values less than 6. The search engine is able to return the generated search statistics in a variety of ways. The preferred embodiment provides for the search engine returning 8 delays corresponding to the maximum search statistics for each of the pair of antennas searched.

The search statistics are processed at step 412 to identify the set of candidate delays. The search statistics returned from different antennas at the same PN offset are then added and compared to a pre-defined constant detection threshold, T (threshold T is scaled pro-rate with the number of searches). If the combined search statistics for any PN offset exceeds T, the offset is recorded. If more than one offset exceeds T, the top offsets are recorded and ranked.

If no candidates are generated by the phase 1 search, no further action is taken other than to wait until the next search results become available. If candidates are available, then at step 416, without interrupting the search process, fingers are assigned—optionally in pair-wise fashion, one to each antenna, at the indicated delay—prioritized by descending search statistic value until the supply of fingers is exhausted. This marks the start of phase 2.

Since all PCGs of the preamble sequence are occupied, the lock filters and delay lock loops associated with each finger are configured to update during every PCG, rather than every ⅛-rate PCG as in the prior art implementation. The fingers are also configured to operate on the zeroth Walsh symbol output. This maintains the use of the preamble signal—the preferred acquisition signal—as input to the phase 2 verification test.

The output level of each lock filter associated with a finger is then sampled at the end of each PCG, step 418. If the lock filter output of an assigned finger remains above a pre-defined constant threshold TLF2 for NLOCK (typically 4) consecutive PCGs, that finger satisfies the phase 2 verification test, and the phase 3 test begins. If none of the finger assignments satisfy the phase 2 lock test, the assignments are abandoned. The optimal candidates from the most recent completed search are then inspected to generate the next set of finger assignments, and phase 2 recommences.

It is possible to declare acquisition at this point, reconfigure the demodulator fingers, and configure the power control algorithm and rate determination algorithms for demodulation. At the cost of further delay (approximately 20–40 ms) however, preamble acquisition may be declared with greater certainty by implementing phase 3 of the preamble acquisition procedure 400.

Phase 3 begins at step 420 with an attempt to demodulate a 20 ms frame consisting of the preamble sequence. First, the assigned fingers remaining after phase 2 are reconfigured to select the maximum energy Walsh symbol rather than Walsh symbol zero. In order to ensure that an entire 20 ms frame is demodulated a delay period is provided.

If acquisition has been successfully achieved, the information bits recovered from the Viterbi decoder should be the all-zero information sequence, or at least have a small number of "ones". If fewer than L1 (a typical value would be 140) of the 172 information bits recovered from the full-rate Viterbi decode operation are demodulated as zero, the finger assignments are again abandoned, new candidates are obtained from the most recent search, and phase 2 of the preamble acquisition procedure 400 is re-entered, step 422.

If more than L1 information bits are zero, but less than L2 bits (typically all 172 information bits), step 424, it is clear that the preamble sequence has been acquired, but the reverse link is not capable of receiving the MS Ack. Order with high reliability.

Optionally, so-called "inner-loop" power control may be initialized at this point with a setpoint designed to achieve 1% full-rate frame erasure rate (for example, an 8 db Eb/No initial setpoint would be sufficient), step 428. A more robust and conservative approach, at the expense of 2–5 20 ms frames of further delay, is to re-program the power control pattern register to generate a +D dB (typically +2 dB) sequence over a single 20 ms frame, step 426, and then revert to the idle sequence. Preamble frame demodulation is re-attempted on the next received frame. This process repeats until a frame is demodulated with greater or equal to L2 zeros, step 424, or until N1 (typically 3) such iterations have occurred. If the number of zero information bits in the demodulated frame is still less than L2 at this point, the finger assignments are abandoned and phase 2 of the preamble acquisition procedure 400 is re-entered with new candidates from the search engine.

If a frame with greater than or equal to L2 information bits is successfully demodulated, preamble acquisition is declared. This preamble frame is the first frame marked as an erasure frame on the STRAU link to the XCDR, thus properly triggering the BS Ack. Order (i.e., all prior frames have been marked as STRAU IDLE frames). Detection of this frame also causes the power control, and rate determination functions to be initialized, step 428.

At the PCG boundary following acquisition of the first preamble frame, the assigned fingers are re-configured to update at ⅛-rate. At the same time, the power control outer loop is configured to execute for the first time on the next frame boundary, and multipath searching commences.

Rather than configuring the Service Option 1 rate determination function to begin to operate on subsequent received frames, at step 430, a modified rate determination function—for convenience termed the Signaling Rate Determinate (SRD) function—is used instead. The SRD remains in use until the Service Option Response Order signaling MS 106 to change to variable-rate transmission is sent, after which the SRD is replaced by the rate set 1 or rate set 2 rate determination function.

Since variable-rate transmissions are not encountered until the Service Option Response Order is transmitted, the only frame type that may be received during acquisition are: preamble—composed of all-zeros information sequence, idle frames—composed of all-ones information sequence, and full-rate—used to convey the MS Ack. Order following BS Ack. Order used to indicate preamble acquisition. This is transmitted along with a reliable 12-bit CRC.

Accordingly, the SRD may operate simply by recovering from the CSM the full-rate and ⅛-rate decoded information sequences, and the full-rate CRC result. The SRD process operates by first, if the full-rate decoded information sequence is the all-zero sequence, the frame is declared a preamble frame, step 432. This is passed to the power control output loop as a valid full-rate frame, and to the STRAU as an erasure. Otherwise, if the full-rate CRC is good, and optionally if the full-rate frame signaling bits are set MM=1, TT=0, and TM=11, the frame is declared a valid signaling frame, step 436. This frame is passed to the STRAU as a signaling frame, and to the power control outer loop as a good full-rate frame. Otherwise, if the ⅛-rate decoded information is the all-ones sequence, the frame is declared a valid ⅛-rate frame, step 434. This frame is passed to the STRAU as a valid ⅛-rate speech frame, and to the power control outer loop as a good ⅛-rate. Otherwise, the frame is passed to the STRAU and to the power control output loop as an erasure.

After reception of the same number of ⅛-rate frames required to cause the XCDR to recognize the presence of valid ⅛-rate frames and hence send the Service Option Response Order (typically 3 consecutive ⅛-rate frames) the Service Option 1 rate determination algorithm replaces the SRD. The receiver is now operating in steady-state Traffic channel mode.

It is finally worth noting that, given the processing delays associated with the network and other aspects of call origination, the extra receiver delays required to perform the proposed 3-stage acquisition verification procedure 400 will not significantly prolong the time required to originate a call.

The present invention encompasses a method and associated apparatus for call setup, a particularly, for preamble transmission acquisition and acknowledgement. The procedure advantageously provides for early, during call setup, mobile station transmit power control and reduces the likelihood of false preamble acquisition. The teachings of the present invention, however, will find application beyond the specific embodiments discussed herein.

We claim:

1. A method of controlling a transmit power of a remote communication unit operating in a wireless communication system, the wireless communication system including at least one base communication station, the method comprising:

transmitting from the remote communication unit a preamble message;

receiving at the base communication station the preamble message;

evaluating the content of the received preamble message and generating a quality metric, wherein the quality metric comprises one of a group consisting of a search statistic and a bit error rate; and adjusting the transmit power of the remote communication unit based upon the quality metric.

2. The method of claim 1, wherein the preamble message comprises a frame of data, and the step of evaluating the content of the preamble message comprises comparing a received frame content with an anticipated frame content.

3. The method of claim 2, wherein the frame of data includes a frame type, and wherein the step of evaluating the content of the preamble message further comprises determining the frame type.

4. The method of claim 1, wherein the wireless communication system comprises a communication system in accordance with one of a group consisting of: a code division multiple access communication system, a time division multiple access communication system, an analog cellular communication system.

5. A method for processing a communication request in a communication system comprising:

receiving at a base station a communication request signal from a communication unit operating in the communication system;

searching the communication request signal for multipath components;

verifying the existence of the multipath components;

recovering information from the multipath components;

comparing the recovered information to predetermined communication request information; and sending an acknowledgment signal from the base station to the communication unit when the recovered information corresponds to the predetermined communication request information with a predetermined certainty.

6. The method of claim 5, wherein the step of searching the communication request signal for multipath components comprises generating a search statistic corresponding to each of a plurality of spaced delays.

7. The method of claim 6, wherein the step of generating a search statistic comprises integrating, over a number of Walsh symbols, the energy of a zeroth Fast Hadamard Transform output despread at a pseudonoise offset associated with each of the spaced delays.

8. The method of claim 7, wherein the number of Walsh symbols is the range of 2 and 5 Walsh symbols.

9. The method of claim 6, wherein the step of generating a search statistic comprises generating over a specific period the energy of a pilot signal associated with the communication request signal.

10. The method of claim 9, wherein the pilot signal comprises a prior known sequence.

11. The method of claim 6, comprising the step of ranking the plurality of spaced delays according to a value of the search statistic.

12. The method of claim 6, wherein the step of receiving at a base station a communication request signal comprises receiving at a pair of antennas at the base station a communication request signal.

13. The method of claim 12, wherein the step of generating a statistic corresponding to each of a plurality of spaced delays comprises generating a statistic corresponding to each of a plurality of delays at each of the pair of antennas.

14. The method of claim 13, wherein the step of generating a statistic comprises integrating, over a number of Walsh symbols, the energy of a zeroth Fast Hadamard Transform output despread at a pseudonoise offset associated with each of the spaced delays.

15. The method of claim 14, comprising the step of ranking the plurality of spaced delays according to a value of the search statistic.

16. The method of claim 15, wherein the step of ranking the plurality of spaced delays comprises summing, for corresponding pseudonoise offsets, search statistics for spaced delays at each of the pair of antennas.

* * * * *